(12) United States Patent
Chifuku et al.

(10) Patent No.: US 6,328,899 B1
(45) Date of Patent: Dec. 11, 2001

(54) METHOD AND APPARATUS FOR TREATING WASTEWATER CONTAINING ORGANIC SULFUR COMPOUNDS

(75) Inventors: Hiroyuki Chifuku, Hyogo-ken; Yoshio Takamura, Osaka; Takahiro Yano, Osaka; Toshiaki Muratani, Osaka, all of (JP)

(73) Assignees: Shinko Pantec Co., Ltd., Kobe; Sharp Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 09/537,218

(22) Filed: Mar. 30, 2000

(30) Foreign Application Priority Data

Mar. 31, 1999 (JP) .................................................. 11-090946

(51) Int. Cl.$^7$ ....................................................... C02F 1/66
(52) U.S. Cl. ........................... 210/749; 210/205; 210/908; 210/916
(58) Field of Search .................................... 210/601, 743, 210/749, 205, 916, 908

(56) References Cited

U.S. PATENT DOCUMENTS 4,300,995 * 11/1981 Liotta .
4,816,139 * 3/1989 Keyworth .

* cited by examiner

*Primary Examiner*—Chester T. Barry
(74) *Attorney, Agent, or Firm*—Oblon, Spivak, McClelland, Maier & Neustadt, P.C.

(57) ABSTRACT

The present invention provides a method of treating water containing organic sulfur compounds. The method includes treating the water containing the organic sulfur compounds by adding wastewater containing a quaternary ammonium compound or wastewater containing an amine thereto. An apparatus for carrying out the above method is also provided.

10 Claims, 2 Drawing Sheets

METHOD AND APPARATUS FOR TREATING WASTEWATER CONTAINING ORGANIC SULFUR COMPOUNDS

BACKGROUND OF THE INVENTION

1. Field of the Invention

This invention relates to a method and an apparatus for treating wastewater containing organic sulfur compounds, and more particularly, a method for biologically decomposing wastewater containing organic sulfur compounds such as dimethyl sulfoxide (hereinafter referred to DMSO), etc., while suppressing offensive odor, and an apparatus for carrying out such decomposition.

2. Description of the Prior Art

Accompanying introduction of DMSO as release agents and cleaning agents in the field of the electronic industry, needs for decomposing of DMSO are increasing. For such needs, the present inventors have developed a biological treatment method of decomposing DMSO, as described in Japanese Patent No. 2769973.

For biologically decomposing DMSO, nitrogen and phosphorus are needed. However, rinsing water generated through the manufacturing process of electronic parts does not contain nitrogen and phosphorous, so that ammonia or other ammonium compounds, as a source of nitrogen has to be added to the rinsing water.

Therefore, a conventional apparatus for biologically decomposing wastewater includes an ammonia reservoir tank 5a in addition to a pH adjustment tank 1a and a biological treatment tank 2a, as illustrated in FIG. 2. The ammonia reservoir tank 5 stores ammonia or ammonium compounds for supplying them to the pH adjustment tank 1a. This conventional apparatus, however, poses a problem of involving the additional expenses for purchasing ammonium compounds, etc., to be used as the source of nitrogen, and necessitating the installation of the ammonia reservoir tank, resulting in the large size of equipment.

On the other hand, factories, which manufacture electronic parts, use tetramethylammonium hydroxide (hereinafter referred to TMAH) as a developing solution, and discharge wastewater having a TMAH concentration of about 0.5 to 2 wt. %, the disposal of which wastewater requires considerable cost. The factories also discharge monoethanolamine in addition to TMAH, which poses a problem of how to treat it. Conventionally, specialized companies or the like usually dispose of MEA containing wastewater or TMAH containing wastewater, while there has been developed, in these years, a technique for biologically treating such wastewater without the necessity of the other wastewater to be mixed therewith. However, those conventional methods pose a problem of requiring considerable cost for the treatment of the wastewater, which will be carried out in a different place from the factory.

The unit cost for treating the TMAH containing wastewater is about 50,000 Japanese yen (JNY) per 1 m$^3$. When the wastewater of 15 m$^3$ is to be treated, it would cost about 750,000 JNY per day.

For TMAH, it contains nitrogen in an amount of 15.3 wt. %. This means that, even if TMAH contained in the wastewater has a concentration of 1 wt. %, the wastewater to be treated has a nitrogen concentration of 1530 mg/L. To remove nitrogen of such a high concentration, additional equipment or the like for removing nitrogen would be required.

It is an object of the present invention to provide a method of treating wastewater containing organic sulfur compounds that is capable of treating the wastewater without the use of ammonia or other ammonium compounds as the source of nitrogen, and hence reducing the cost for it, as well as omitting the ammonia reservoir tank and hence reducing the space for the installation of the wastewater treatment equipment.

It is another object of the present invention to provide a method of treating wastewater containing sulfur compounds that is capable of reducing cost for treating waste materials such as TMAH and MEA.

It is a still further object of the present invention to provide an apparatus for carrying out the above method.

SUMMARY OF THE INVENTION

In accordance with the above objects, there is provided a method of treating wastewater containing organic sulfur compounds. The method includes treating the wastewater containing the organic sulfur compounds by adding wastewater containing a quaternary ammonium compound or wastewater containing an amine thereto.

The quaternary ammonium compound is preferably tetramethylammonium hydroxide.

The amine is preferably monoethanolamine.

The amount of the quaternary ammonium compound or the amine to be added in the wastewater containing the organic sulfur compounds is preferably adjusted according to the concentration of organic substances in the wastewater containing the organic sulfur compounds.

More preferably, the amount of the quaternary ammonium compound or the amine is adjusted to enable the resultant wastewater, which contains the organic sulfur compounds, and the quaternary ammonium compound or the amine, to contain nitrogen in an amount of 3 to 60 wt. % with respect to the total organic carbon (hereinafter referred to TOC) of the resultant wastewater.

According to another aspect of the present invention, there is provided an apparatus for treating wastewater containing organic sulfur compounds, which includes a pH adjustment tank for adjusting the pH value of the wastewater containing the organic sulfur compounds, a biological treatment tank for biologically treating the wastewater containing the organic sulfur compounds whose pH value has been adjusted in the pH adjustment tank, and a reservoir tank for storing wastewater containing a quaternary ammonium compound or wastewater containing an amine to be fed to the wastewater containing the organic sulfur compounds.

The present inventors have directed their attentions to the fact that the quaternary ammonium compound and the amine respectively contain nitrogen, and found the utilization of nitrogen contained in the quaternary ammonium or the amine as the source of nitrogen in the biological treatment tank for biologically treating the wastewater containing the organic sulfur compounds such as DMSO.

Nitrogen is contained in, for example, TMAH, in an amount of about 15.3 wt. %, and hence is utilized as the source of nitrogen in the course of biological treatment. This simultaneously achieves both reduction of the amount of at least one of the quaternary ammonium compound and the amine, and the reduction of the expenses for purchasing the source of nitrogen used for biological treatment of DMSO.

The method of the present invention, which includes treating the wastewater containing the organic sulfur compounds by adding the wastewater containing the quaternary ammonium compound or the wastewater containing the amine thereto, can utilizes the quaternary ammonium compound or the amine as the source of nitrogen for the biological treatment of the wastewater containing the organic sulfur compounds This achieves the simultaneous treatments of the wastewater containing the organic sulfur compounds, and the wastewater containing the quaternary ammonium compound or the wastewater containing the amine Consequently) the above arrangement can omit ammonia conventionally used as the source of nitrogen, and hence advantageously reduce the expenses for purchasing ammonia.

In addition, the above arrangement can omit a reservoir tank for ammonia, and therefore produce an advantageous effect of reducing the space for the wastewater treatment facility.

Unlike the conventional methods, the utilization of the quaternary ammonium compound or the amine themselves as the source of nitrogen can produce an effect of reducing the cost of the waste treatment of TMAH and the like.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

The description will be made for a first embodiment of a method and apparatus for treating wastewater containing organic sulfur compounds in accordance with the present invention.

Figure 1:
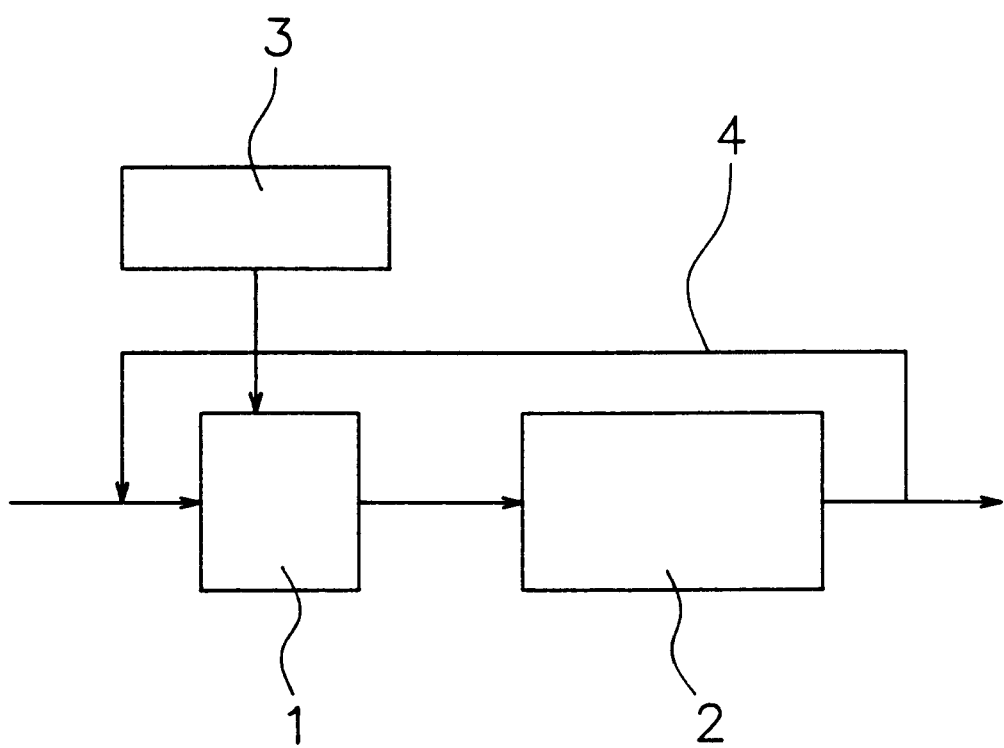
FIG. 1 is a block schematic diagram of an apparatus for treating wastewater containing organic sulfur compounds in accordance with one embodiment of the present invention.
Figure 2:
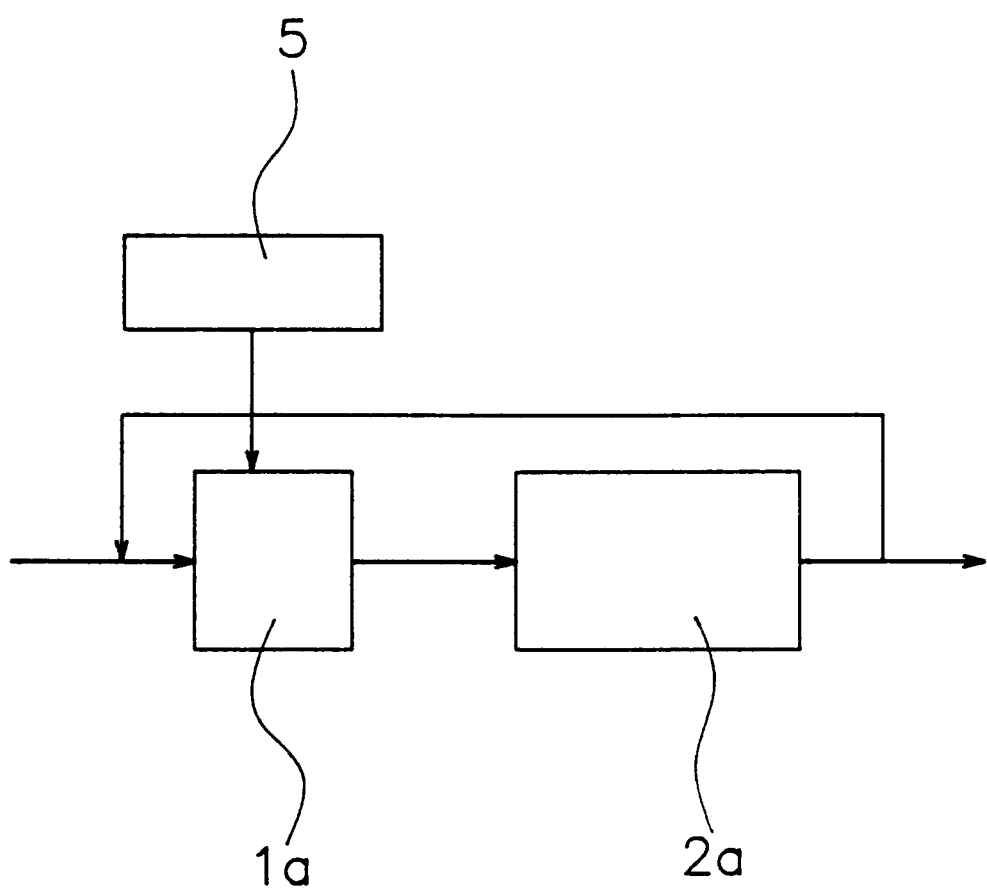
FIG. 2 is a block schematic diagram of a conventional apparatus.

Referring to FIG. 1, the apparatus includes a pH adjustment tank 1 for adjusting the pH value of raw water supplied from a factory or the like. The pH adjustment tank 1 is, in turn, equipped with a pH measuring instrument (not shown) for measuring the pH value of the raw water in the pH adjustment tank 1, and other devices.

The apparatus also includes a biological treatment tank 2 for biologically treating the raw water whose pH has been adjusted in the pH adjustment tank 1. The biological treatment tank 2 is provided with a pH measuring instrument (not shown), a diffuser (not shown) and the like. A biological filtration device (not shown) may be used for the biological treatment tank 2.

The apparatus also includes a reservoir tank 3 for containing TMAH to be supplied to the pH adjustment tank 1. TMAH to be stored within the reservoir tank 3 is originally contained in factory wastage.

The method of treating the wastewater containing the organic sulfur compounds by using the apparatus as mentioned above will be now discussed.

The DMSO containing raw water, which has been discharged from the factory, is fed into the pH adjustment tank 1, whose pH is adjusted according to the pH value of the raw water fed thereinto. TMAH utilized as a source of nitrogen contained in the reservoir tank 3 is then added to the raw water present in the pH adjustment tank 1. In this case, the amount of TMAH to be added to the DMSO containing raw water is adjusted to enable the resultant DMSO and TMAH containing raw water to contain nitrogen in an amount of 3 to 60 wt. % with respect to TOC thereof.

The raw water whose pH has been adjusted in the pH adjustment tank 1 is then fed into the biological treatment tank 2 for the biological treatment. By this biological treatment is meant that DMSO and the like in the raw water are biologically decomposed by microorganisms.

The raw water thus biologically treated within the biological treatment tank 2 is partially released to the outside, while the remaining raw water is returned to the pH adjustment tank 1 via a flow path 4.

The returning of the treated water to the pH adjustment tank 1 is repeatedly carried out to dilute the raw water to a predetermined degree, and hence reduce the concentration of DMSO within the pH adjustment tank 1, the biological treatment tank 2 and the like.

TEST EXAMPLES

The testing has been conducted to evaluate treatment capabilities of various sources of nitrogen by using the activated sludge method.

The simulated wastewater having a DMSO concentration of 550 mg/L was prepared to be utilized as DMSO containing wastewater in the test, into which $NH_4Cl$, TMAH, and MEA were respectively added to determine the treatment capability of each source of nitrogen.

The nitrogen content was varied within the range of 3 to 55 wt. % with respect to TOC of the mixed liquid of DMSO and the source of nitrogen (i.e., $NH_4Cl$, TMAH, MEA and the like).

The flowing amount of the wastewater was adjusted to have a load of 0.3 kgTOC/$m^3$d with respect to the activated sludge for the testing.

The test results are shown in Table 1.

TABLE 1

| Type of source of nitrogen | Added amount N/TOC (wt. %) | Treated water quality (mg/L) | | |
|---|---|---|---|---|
| | | S-TOC | TMAH | MEA |
| $NH_4CL$ | 3 | 5.3 | — | — |
| | 30 | 4.2 | — | — |
| | 50 | 4.5 | — | — |
| TMAH | 3 | 5.5 | <0.1 | — |
| | 10 | 4.5 | <0.1 | — |
| | 25 | 4.3 | <0.1 | — |
| MEA | 10 | 5.7 | — | <0.1 |
| | 30 | 5.1 | — | <0.1 |
| | 55 | 5.3 | — | <0.1 |

As being apparent from the results shown in the Table 1, $NH_4Cl$ utilized as the source of nitrogen could treat DMSO under a stabled condition.

The testing conducted by replacing $NH_4Cl$ with TMAH also showed a stabilized treatment of DMSO.

Adding TMAH of an excessive amount didn't degrade the treatment efficiency, and itself could be entirely decomposed, if TMAH is added by an amount within the range of the source of nitrogen as shown in Table 1. Even if the nitrogen concentration of the treated water increased, the result of the treatment didn't show a remarkable change.

A stabilized treatment of DMSO could also be achieved with MEA, similarly to the other sources of nitrogen.

A biological filtration device was used as an actual apparatus of the present invention, and operated by using the TMAH containing wastewater with its added amount of 50 mg/L.

Since nitrogen of 5 wt. % with respect to TOC or 1.5 wt. % with respect to the DMSO concentration is needed to biologically treat the wastewater of 1000 $m^3$/d having a DMSO concentration of 600 mg/L, nitrogen of 9 kg is needed per day, as given by the following formula:

$$600 \times 1000 \times 10^{-3} \times 0.015 = 9 \text{ kgN/d}.$$

If nitrogen of such an amount is supplied with $NH_4Cl$, the total cost of $NH_4Cl$ with its net price of 200 JYN/N–kg is:

$$9 \times 200 \text{JYN} = 1800 \text{ JYN/d} \tag{1}$$

Since a nitrogen content in TMAH is 15.4% when assuming that a TMAH concentration is 0.8%, the total amount of the TMAH containing wastewater to be added per day is:

$$9 \div 0.154 \div 0.08 = 7305 \text{ kg/d} \tag{2}$$

It is therefore possible to consume a TMAH containing wastewater of about 7.3 $m^3$ per day.

Assuming that the cost of treating the TMAH containing wastewater is 50,000 $JYN/m^3$, it can be reduced by about 365,000 JYN per day. That is:

$$7.3 \times 50000 = 365000 \text{ JYN/d}$$

Thus, the operational cost can be reduced by about 370000 JPN ((1)+(3)) per day.

OTHER EMBODIMENTS

Although the above description was made for the embodiment, in which the DMSO containing wastewater is treated, the present invention is also applicable to the wastewater including various organic sulfur compounds other than DMSO. That is, it is essential that the wastewater to be treated contains organic sulfur compounds.

Preferably, a selected amount of TMAH is added to the DMSO containing raw water to enable the resultant DMSO and TMAH containing raw water to contain nitrogen in an amount of 3 to 60 wt. % with respect to TOC thereof. However, the added amount of TMAH is not necessarily limited to such an amount.

In the above embodiment, the flow path 4 was provided to return the part of the biologically treated water to the biological treatment tank 2. However, it is not essential in the present invention to provide the flow path 4.

The reservoir tank 3 for storing TMAH is not also essential in the present invention. Rather, the TMAH containing wastewater can be directly fed into the wastewater containing the organic sulfur compounds, if there is less variation in the amount of TMAH discharged from a factory or the like.

In the above embodiment, the TMAH containing wastewater is added to the pH adjustment tank 1. However, the feeding portion, through which the TMAH containing wastewater is added, is not limited to the pH adjustment tank 1. Rather, the TMAH containing wastewater can be fed to various portions. For example, it can be fed to the portion where the raw water before entering the pH adjustment tank 1 exists, and a pipeline between the pH adjustment tank 1 and the biological treatment tank 2.

The TMAH containing wastewater is used as being added to the organic sulfur compounds. This is not essential in the present invention. Monoethanolamine containing wastewater or the like can be used. That is, it is essential that the wastewater containing quaternary ammonium compound or the wastewater containing the amine is added to the wastewater containing the organic sulfur compounds.

This specification is by no means intended to restrict the present invention to the preferred embodiments set forth therein. Various modifications to the method and the apparatus for treating wastewater containing organic sulfur compounds, as described herein, may be made by those skilled in the art without departing from the spirit and scope of the present invention as defined in the appended claims.

What is claimed is:

1. A method of treating wastewater containing organic sulfur compounds comprising treating the wastewater containing the organic sulfur compounds by adding wastewater containing a quaternary ammonium compound or wastewater containing an amine thereto.

2. A method of treating wastewater containing organic sulfur compounds according to claim 1, wherein the amount of the quaternary ammonium compound or the amine is adjusted according to the concentration of organic substances in the wastewater containing the organic sulfur compounds.

3. A method of treating wastewater containing organic sulfur compounds according to claim 1, wherein the amount of the quaternary ammonium compound or the amine is adjusted to enable the resultant wastewater, which contains the organic sulfur compounds, and the quaternary ammonium compound or the amine, to contain nitrogen in an amount of 3 to 60 wt. % with respect to the total organic carbon of said resultant wastewater.

4. A method of treating wastewater containing organic sulfur compounds according to claim 1, wherein the quaternary ammonium compound is tetramethylammonium hydroxide.

5. A method of treating wastewater containing organic sulfur compounds according to claim 4, wherein the amount of the quaternary ammonium compound or the amine is adjusted according to the concentration of organic substances in the wastewater containing the organic sulfur compounds.

6. A method of treating wastewater containing organic sulfur compounds according to claim 4, wherein the amount of the quaternary ammonium compound or the amine is adjusted to enable the resultant wastewater, which contains the organic sulfur compounds, and the quaternary ammonium compound or the amine, to contain nitrogen in an amount of 3 to 60 wt. % with respect to the total organic carbon of said resultant wastewater.

7. A method of treating wastewater containing organic sulfur compounds according to claim 1, wherein the amine is monoethanolamine.

8. A method of treating wastewater containing organic sulfur compounds according to claim 7, wherein the amount of the quaternary ammonium compound or the amine is adjusted according to the concentration of organic substances in the wastewater containing the organic sulfur compounds.

9. A method of treating wastewater containing organic sulfur compounds according to claim 7, wherein the amount of the quaternary ammonium compound or the amine is adjusted to enable the resultant wastewater, which contains the organic sulfur compounds, and the quaternary ammonium compound or the amine, to contain nitrogen in an amount of 3 to 60 wt. % with respect to the total organic carbon of said resultant wastewater.

10. An apparatus for treating wastewater containing an organic sulfur compound, comprising:

a pH adjustment tank in which the pH value of the wastewater containing the organic sulfur compound is adjusted;

a biological treatment tank in which the wastewater containing the organic sulfur compound and having an adjusted pH value is biologically treated; and a reservoir tank in which wastewater containing a quaternary ammonium compound or wastewater containing an amine to be fed to the wastewater containing the organic sulfur compound is stored.

* * * * *